(12) United States Patent
Osseiran

(10) Patent No.: US 11,393,351 B2
(45) Date of Patent: Jul. 19, 2022

(54) PRAYER DEVICE

(71) Applicant: Ali Sami Bek Osseiran, Al Khobar (LB)

(72) Inventor: Ali Sami Bek Osseiran, Al Khobar (LB)

(*) Notice: Subject to any disclaimer, the term of this patent is extended or adjusted under 35 U.S.C. 154(b) by 326 days.

(21) Appl. No.: 15/578,073

(22) PCT Filed: Apr. 1, 2015

(86) PCT No.: PCT/US2015/023869
§ 371 (c)(1),
(2) Date: Nov. 29, 2017

(87) PCT Pub. No.: WO2016/160011
PCT Pub. Date: Oct. 6, 2016

(65) Prior Publication Data
US 2018/0218624 A1     Aug. 2, 2018

(51) Int. Cl.
*G09B 5/06* (2006.01)

(52) U.S. Cl.
CPC ....................................... *G09B 5/06* (2013.01)

(58) Field of Classification Search
CPC ......................................................... G09B 5/06
See application file for complete search history.

(56) References Cited

U.S. PATENT DOCUMENTS

| | | | |
|---|---|---|---|
| 5,404,343 A | 4/1995 | Boggio | |
| 6,324,736 B1 * | 12/2001 | Atrio | A61G 17/04 27/2 |
| 6,414,663 B1 | 7/2002 | Manross, Jr. | |
| 6,980,107 B1 | 12/2005 | Ziegler | |
| 7,089,495 B2 | 8/2006 | Barrows | |
| 7,287,225 B2 | 10/2007 | Mindrum | |
| 7,395,960 B1 * | 7/2008 | Toothman, III | G06K 17/0022 235/376 |
| 7,609,506 B2 | 10/2009 | Aguirre | |
| 7,765,656 B2 * | 8/2010 | Dannenberg | A61G 17/04 27/31 |
| 9,226,059 B1 * | 12/2015 | Knight | A61G 17/04 |
| 9,433,297 B2 * | 9/2016 | Al-Saraj | A47G 33/008 |
| 9,658,819 B2 * | 5/2017 | Wellman | G05B 15/02 |
| 9,987,184 B2 * | 6/2018 | Borovinov | A61G 17/00 |
| 2001/0003654 A1 | 6/2001 | Shetty | |
| 2001/0036354 A1 * | 11/2001 | Majors | H04N 7/18 386/231 |
| 2003/0100323 A1 * | 5/2003 | Tajima | G06Q 10/109 455/502 |
| 2003/0133294 A1 * | 7/2003 | Sittner | F21S 9/037 362/253 |

(Continued)

FOREIGN PATENT DOCUMENTS

JP     2012_014663 A     1/2012

*Primary Examiner* — Milap Shah
(74) *Attorney, Agent, or Firm* — Bacon & Thomas, PLLC

(57) ABSTRACT

A digital/electronic personal prayer device may be installed at gravesite or carried on the person of a user to provide spiritual support at all times, and includes digital storage for sacred texts, prayers, supplications, and spiritual guidance, with options (by way of example and not limitation) for self-play of prayers and/or recitations of sacred texts at preset times, voice and text synchronism, storage and playback of multimedia files commemorating the deceased.

18 Claims, 4 Drawing Sheets

(56) References Cited

U.S. PATENT DOCUMENTS

| | | | |
|---|---|---|---|
| 2005/0073911 A1* | 4/2005 | Barnett | A47G 33/008 368/10 |
| 2005/0233775 A1* | 10/2005 | Chang | H04M 1/72583 455/567 |
| 2005/0237859 A1* | 10/2005 | Jibrin | G04G 9/0076 368/47 |
| 2005/0268235 A1 | 12/2005 | Stone | |
| 2006/0075343 A1* | 4/2006 | Henry | H04N 21/41415 715/704 |
| 2006/0083112 A1* | 4/2006 | Sim | G04G 11/00 368/10 |
| 2006/0177806 A1* | 8/2006 | Parsons | A44C 23/00 434/246 |
| 2007/0042332 A1* | 2/2007 | Leem | G06F 16/68 434/156 |
| 2007/0067054 A1* | 3/2007 | Danish | A47G 33/008 700/94 |
| 2010/0003654 A1* | 1/2010 | Thompson | G09B 19/00 434/245 |
| 2010/0146750 A1* | 6/2010 | Dannenberg | A61G 17/04 27/1 |
| 2010/0146752 A1* | 6/2010 | Dannenberg | A61G 17/04 27/2 |
| 2010/0158478 A1 | 6/2010 | Gomez, Jr. | |
| 2010/0177601 A1* | 7/2010 | Kim | G01C 17/34 368/14 |
| 2010/0293498 A1* | 11/2010 | Maxfield | G06F 3/0219 715/776 |
| 2013/0083632 A1* | 4/2013 | Al Abdeen | G04G 13/026 368/10 |
| 2013/0147838 A1* | 6/2013 | Small | G06F 3/013 345/633 |
| 2013/0323689 A1* | 12/2013 | Bates | G09B 5/04 434/167 |
| 2014/0039675 A1* | 2/2014 | Ead | G06N 3/008 700/245 |
| 2014/0113260 A1* | 4/2014 | Abouelsaadat | A47G 33/008 434/245 |
| 2014/0211961 A1* | 7/2014 | Koch | G08C 17/02 381/77 |
| 2014/0328495 A1* | 11/2014 | Ivry | H04R 1/028 381/87 |
| 2015/0058311 A1* | 2/2015 | Neal | G06F 16/532 707/706 |
| 2015/0161898 A1* | 6/2015 | Bates | G09B 5/04 434/320 |
| 2015/0186105 A1* | 7/2015 | Wellman | G05B 15/02 700/94 |
| 2015/0324896 A1* | 11/2015 | Marson | G06Q 50/01 705/27.2 |
| 2015/0370285 A1* | 12/2015 | Almosa | G04G 21/025 434/245 |
| 2016/0045051 A1* | 2/2016 | Aven | A47G 33/00 434/245 |

\* cited by examiner

Surah / Chapter : Ar-Rahmān (The Beneficent) - سورة الرحمن
Translation: Sahih International

بسم الله الرحمن الرحيم

كُلُّ مَنْ عَلَيْهَا فَانٍ ﴿٢٦﴾

"Everyone upon the earth will perish,

وَيَبْقَىٰ وَجْهُ رَبِّكَ ذُو ٱلْجَلَٰلِ وَٱلْإِكْرَامِ ﴿٢٧﴾

And there will remain the Face of your Lord, Owner of Majesty and Honor."

Surah / Chapter : Surat Al-Fajr (The Dawn) - سورة الفجر
Translation: Sahih International

بسم الله الرحمن الرحيم

يَٰٓأَيَّتُهَا ٱلنَّفْسُ ٱلْمُطْمَئِنَّةُ ﴿٢٧﴾

[To the righteous it will be said], "O reassured soul,

ٱرْجِعِىٓ إِلَىٰ رَبِّكِ رَاضِيَةً مَّرْضِيَّةً ﴿٢٨﴾

Return to your Lord, well-pleased and pleasing [to Him],

فَٱدْخُلِى فِى عِبَٰدِى ﴿٢٩﴾

And enter among My [righteous] servants

وَٱدْخُلِى جَنَّتِى ﴿٣٠﴾

And enter My Paradise."

Fig. 4

PRAYER DEVICE

BACKGROUND OF THE INVENTION

1. Field of the Invention

The invention relates to an electronic apparatus in the form of a specialized prayer device that serves as a robotic spiritual companion for people seeking continuous spiritual comfort. The invention also relates to a method of providing spiritual comfort that utilizes a specialized prayer device, and to software executed by the specialized prayer device.

In a preferred embodiment, the digital/electronic personal prayer device may be installed or mounted on a tombstone or coffin, or carried on a person, to provide spiritual support at all times in life and even after death, and includes digital storage for sacred texts, prayers, supplications, "Thikers" Remembrance, rosaries ("Tasbih"), invocations ("Aawzah"), implorations ("Munajat"), visitor guides and rituals for holy places, and spiritual guidance, with options (by way of example and not limitation) for self-play of prayers and/or recitations of sacred texts at preset times, voice and text synchronism, storage and playback of multimedia files commemorating the deceased.

2. Description of Related Art

As illustrated in FIG. 4, the Qur'an states that "An inevitable fact of death, and the reality is inevitably comes to convey one's life to another life. The illustrated passages express a belief shared by a majority of religions that death is not the end of existence but rather is a transition to another life. This belief offers comfort to billions around the world concerning the fate of loved ones as well as assurance that an individual's acts and life has meaning, and that faith and personal conduct will be rewarded. Religion supports and reinforces this belief through, for example, sacred texts, prayers, rituals including burial and commemoration rites, and the arrangement of gravesites to provide a venue for commemoration and prayer.

While the practice of religion does not require any technology at all, technology can nevertheless be of great assistance to the religious faithful. For example, religious services can be broadcast over television or the Internet, speakers may be used to amplify a call to prayer, and printing technologies may be used to make holy books more accessible or available. The present invention represents a further advance in the use of technology to assist the religious faithful, by providing continuous access to sources of spiritual comfort, including sacred texts, audio, audiovisual presentations, and commemoratives relating to the deceased, and other rituals, as well as religious guidance in situations where access to physical texts and/or a religious or spiritual guide or teacher would normally be unavailable.

According to one aspect of the present invention, the prayer device enables the user or an interment planner to play, by way of example and not limitations, prayers, holy text recitations, holiday observances, "Thikers" Remembrance, or imploration Munajat, and/or commemorate or mourn the deceased at the burial place continuously or at any time, without having to be physically present at the gravesite, and without the limitations of visiting the deceased's gravesite.

The gravesite has always been a place for offering prayers and reciting sacred texts, mourning, and remembrance, where close of kin visit to offer prayers and recitations from holy books, communicate with the deceased, share celebrated holidays and special occasions, play a song, and so forth. However, the overall features of headstones have remained mostly static for centuries, and typically include a name, birth date, date of death religious quotes and figures engraved on the headstone. In some cases, people have begun personalizing their gravestones with custom designs or by including photographic images of their families, loved ones, homes, cars, portraits, religious symbols such as an image representing Christ or the virgin Mary, angels, the Star of David, a star and crescent, or other illustrations using different materials or etched directly into the granite, marble or stone material of the headstone. In some cases, the headstone may include a glass compartment to put in commemorative personal and religious artifacts, pictures, flowers and others.

The problem with such static arrangements is that they do not add much spiritual and religious benefits to visitors and souls of the deceased, as such visits or gatherings at the gravesite usually occur only a few times per year for short periods that gradually decrease with time. The rest of the time, the burial location is unattended by visitors and no one is there to offer prayers and recitation from their holy books, which leaves a chilly and lonesome feeling that the grave of the loved one has been morally abandoned without the safe haven provided by recitation of the words of Allah (God), sacred texts and prayers over the grave to overcome fears and the feeling of family and loved ones that they could do something more to help the deceased in the afterlife and to rest in peace. Further, the survivors of the deceased may therefore find it difficult to keep in touch with the deceased, and worry whether they will personally be properly commemorated as they wish and have the privilege of having continuous recitation of the words of Allah (God), sacred texts and prayers over their resting place after they have died. People mostly visit gravesites to honor the memory of the departed during holidays and special events, and especially to offer prayers, petition for forgiveness, receive blessings with the words of Allah (God), read verses from sacred texts, "Thikers" Remembrance, or imploration Munajat, as well as part of the bereavement process. This might not be enough to fulfill some people's desire to have someone stay near their grave to offer their spirit petitions, blessings, wishes, and prayers, or to recite versus from their holy books and/or remember them during holidays or only at a few locations per year. In addition, options for remembrance at the gravesite are typically limited and diminish with time. Many people may prefer the experience of viewing photographs or video of the deceased during their happier lifetime moments or hear the sound of the deceased's voice, his/her advice, lessons learned etc. Relatives and friends of the deceased often wishes also that they could communicate thoughts and send messages to the deceased or offer prayer to the God that may benefit the deceased.

Another area where the present invention utilizes technology to assist the faithful is in the area of access to holy texts. As noted above, the invention provided a great advance in access to sacred books and other recordings of religious significance. Nevertheless, problems with language or literacy remain barriers to full access to sacred texts. For example, the Qur'an Kareem is written in the Arabic language as descended to Prophet Mohammad (peace be upon him) as the words of Allah, and as a result must be recited in Arabic language, which is a challenge for non-Arabic speaking Muslims. For such non-Arabic speaking people, this invention offers a solution to cross these barriers and further ease access to the blessings and benefits of the Qur'an, which ordinarily requires much time, knowledge, effort, dedication and expense.

Yet another area where the present invention applies technology to enhance religious practice is to provide guidance on the wide variety of rituals, recitations, and so forth associated with major religions. For example, written sources for just the three main Abrahamic faiths include the main sacred texts (Qur'an Kareem, the Christian Bible, and the Hebrew Bible), as well as the Hadith of Prophet (peace be upon him) for Islam and other spiritual sources.

In general, while it is of course possible to find sacred texts, guidance on prayer and ritual, and so forth, on the Internet, access to these sources is limited to times when the person seeking guidance is seated in front of, or has access to, a computer or computing device with an Internet connection and browser, as well as the knowledge or skills to carry out such access and locate all of these sources in a reasonable amount of time. For many persons, this is not enough. There are times or situations when spiritual comfort or guidance is needed and access to the Internet is not adequate or possible. Even when the Internet is available, it does not guarantee finding such broad and specific information in a reasonable time.

The one area where attempts to provide more immediate and accessible spiritual guidance or comfort is the area of commemorating the deceased. For example, U.S. Patent Publication No. 2010/0003654 (Thompson) discloses a device that displays a variety of prayers in response to input of user preferences such as religious denomination, and that permits the user to select from among the displayed prayers for storage and presentation in a desired form, such as by speech or in writing. However, the device disclosed in the Thompson publication is not designed to be fixed to a headstone but rather is a computer or workstation, and thus is not a portable device that can be carried with a user and does not offer robotic or self-play capabilities for prayers and/or recitations of various sacred texts. Also, the device requires human intervention and therefore the presence of a person in order to operate the device, fails to adequately provide for commemoration of the deceased, and does not address other spiritual needs. Other technological approaches to communication with or commemorating deceased persons include the following: U.S. Pat. No. 7,609,506 (Aguirre) discloses a multimedia player for a grave marker that plays tribute to the decedent. The multimedia player may be powered by a solar panel. U.S. Patent Publication No. 2006/0075343 (Henry) discloses a headstone with a built-in multimedia memory module and interface for transferring video or audio data to portable multimedia playback devices carried by visitors to the gravesite. U.S. Patent Publication No. 2010/0158478 (Gomez) discloses a grave marker with a system for displaying videos according to a preset timeline. U.S. Pat. No. 7,287,225 discloses a portable memory device that enables display or playback of information about a decedent, over a variety of different display devices, include a gravesite display device and standalone or network computers. Other gravesite or headstone audio and/or video displays are disclosed in U.S. Pat. No. 8,068,035 (Salcedo), U.S. Pat. No. 7,089,495 (Barrows), U.S. Pat. No. 6,980,107 (Ziegler), U.S. Pat. No. 6,414,663 (Manross), and U.S. Pat. No. 5,404,343 (Boggio), and in U.S. Patent Publication Nos. 2005/0268235 (Stone) and 2001/0036354 (Majors). Finally, U.S. Pat. No. 7,765,656 discloses a wireless display device mounted inside a coffin for communication with a decedent after burial.

None of the technological solutions proposed above comes even close to providing a comprehensive technological approach to providing religious solace and assisting the faithful in complying with appropriate rituals or prayers as well as commemorating those who have died.

SUMMARY OF THE INVENTION

It is accordingly an objective of the invention to provide a portable device that is easy to operate and that offers a complete spiritual companion to assist and comfort the faithful of a variety of faiths and denominations that include belief in an afterlife, including access to holy books at any desired location, as well as data and files for commemorating the deceased. Although portable, it is within the scope of the invention to include optional features that allow the device to be fixed to objects if desired, The specialized prayer device of the invention provides a solution to all of the above-described challenges that no other device can offer. Further it can benefit all kind of people whether literate or illiterate, skilled or not skilled, capable or not, not only for the living but also for the deceased.

The invention is not limited to use in connection with a particular religious faith, but may be utilized by adherents of any of the monotheistic faiths such as a the Abrahamic religions, as well as other faiths that believe in some sort of afterlife.

According to a preferred embodiment of the invention, the prayer device takes the form of a specialized portable digital file storage and playback device. Suitable formats for files include MP3 and/or MP4, as well as newer or proposed multimedia formats such as MP5 or MP6, and any other audio and/or video storage, transmission, and display formats that may be developed in the future, as well as mobile apps and file formats. The portable digital device should have at least a data port, memory, microprocessor, digital signal processor, display, playback controls, an audio port, an amplifier, and a power supply, but there is no limitation as to type of memory, format, and additional functions that the device can provide. In addition, the invention may be implemented by downloading an app to an existing device having the required storage and processing capabilities, such as a smartphone.

The invention can provide spiritual, religious, educational, and communications benefits, as well as aid to people in need or handicaps, commemorative functions, and companionship. To these ends, it is designed to perform several functions including helping those who are seeking at all times the safe haven of Allah (God, The Divine), spiritual comfort, supplications, and prayers. In accordance with the model used and the user's settings, the device could be programmed to play recitations of holy books and the healing words of God (Allah) during life and even after their death. It can automatically play prayers, supplications and recitations from the holy books and other recordings of religious significance.

The invention may provide, in preferred embodiments, synchronization ability to display the text, authentic interpretation, and translation of audio recitation; play prerecorded prayers at programmed set of times. In addition to a combination of prayers, including petition prayers, thanksgiving prayers, daily prayers, teachings, narrated Hadith, أذكار "Thikers" Remembrance, and occasion prayers including holidays tunes and chants that are usually accompanied with holiday prayers and invocations, etc., all in accordance with the model used and the user's settings. Also, some embodiments may include funeral prayers for the dead or Salat al-Janazah (Janazah prayer) for Muslims or supplications for the deceased, and/or information on funeral rites and teachings needed for those who are present at the time of death of others and need to rely on a resource to help them perform funeral rituals and prayers, as well as those who need help preparing the body and burying procedures of the deceased. Such information and regulations can be vital common knowledge, since death often occurs when it is least expected. Other embodiments may alternatively, or in addition, provide the user with a concise compilation of rules and regulations regarding funeral rites and prayers in accordance with the person religious teachings. Such information can be very useful, by way of example, for soldiers and armies to carry with them.

An advantage of the prayer device of the present invention is that it may also serve as a teaching tool to those who wish to learn or collect special prayers and recitation of selected holy books by the best known reciters or voices. Also, the device may serve to teach those who wish to learn or have reading difficulties or disabilities. Thus, it can be an asset and facilitate accumulation of knowledge, by exposing people to a great collection of prayers, holy books, guides and rituals, "Thikers" Remembrance, "Tasbih" rosaries, keys of heaven prayers, "Awzah" invocations, "Heriz" shields, Imploration "Munajat," Ashora; hymns, chants, carols, proper reading and pronunciation of sacred texts, including virtual holy site visits and associated prayers, and so forth.

When used in connection with burial services or commemoration of the deceased, the device may be figuratively represented by an experienced holy man stationed at a burial location in order to recite prayers, blessings, and supplications directed to the deceased, as well as verses from sacred texts in order to bless the deceased spirit with the Lord's words, and seek forgiveness, while at the same time figuratively bringing the deceased to life in the form of remembrances of personal traits and associations such as recordings, music, lyrics, hymns and multimedia that could benefit both the soul of the deceased due to prayers as well as visitors of the deceased's tomb. The device may also include pre-recorded messages either from the deceased, relatives or loved ones in order to be heard or seen by others visiting the grave in future. Thus, the automated spiritual device can hopefully, in this context, bring people closer to God and form another link with loved ones, and add comfort both to the deceased spirit and grave visitors. By adding new communication and commemoration means, the device can turn lifeless granite, stone or any memorial into a lively, more beneficial, interactive, spiritual and personalized grave.

The prayer device of the invention may also, in various embodiments, include features that enable authorized users connect the device to a smartphone, tablet, computer, smart watch, or other computing or communications devices, in order to send or exchange data, add photos, videos, prayer, messages, and updates concerning the deceased, and/or features that provide feedback on the status on the device, power condition, and so forth. Still further, in some embodiments, only visitors with a special access code to the device and or device lock key may be authorized for such access to add or edit information.

In an especially advantageous embodiment of the invention, once power is supplied to the device and settings and selections are made, further operation is automatic with no need for a person to operate it, so that the device can start automatically in accordance with programmed times to carry out each functional task. This is especially useful in connection with gravesite commemoration of the deceased. The prayer device of this embodiment is the only portable device of its kind that can be operated automatically at programmed times after its initial setting and without the need for someone to push buttons. Moreover, it is the only device of its kind that can be easily handled, programmed and installed at or near a grave location quickly by an average person, preferably as a standalone device with no need for conduits installation, wiring, cutting into the headstone or mausoleum.

BRIEF DESCRIPTION OF THE DRAWINGS

FIG. 4 shows passages from the Qur'an concerning death and transition to another life.

DETAILED DESCRIPTION OF THE PREFERRED EMBODIMENTS

Throughout the following description and drawings, like reference numbers/characters refer to like elements. It should be understood that, although specific exemplary embodiments are discussed herein there is no intent to limit the scope of present invention to such embodiments. To the contrary, it should be understood that the exemplary embodiments discussed herein are for illustrative purposes, and that modified and alternative embodiments may be implemented without departing from the scope of the present invention.

Figure 1:
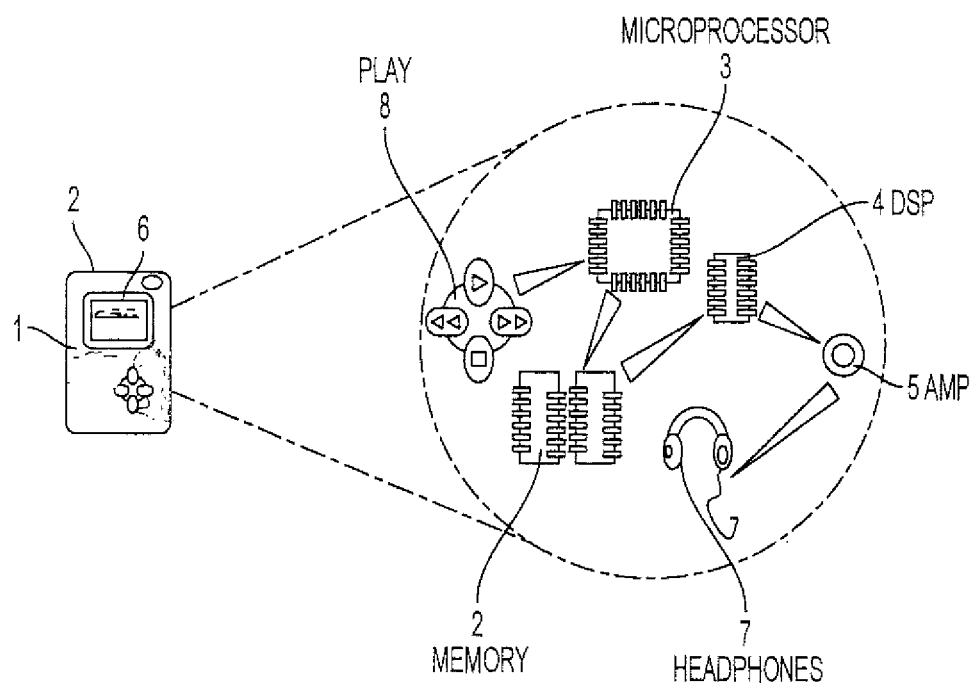
FIG. 1 is a schematic illustration of the specialized prayer device of the present invention.

FIG. 1 shows basic hardware components of a prayer device 1 according to a preferred embodiment of the invention. The prayer device 1 includes a data port (not shown) through which data and files may be exchanged with an external computing device such as a notebook or desktop computer. The data port may be a wired or wireless communications port. The prayer device further includes a memory 2 for storing downloaded data or files may be in the form of a solid state (flash) memory or disk drive, and typically can hold several Gigabytes of data, which is sufficient to hold data files of the type necessary to implement the present invention. A microprocessor 3 is provided to control prayer device functions such as input/output functions, display functions, reading and writing of data from and to the memory 2, and execution of application or control programs. Digital signal processor 4 is a specially integrated circuit component that enables processing of audio or video files for playback upon retrieval from memory 2 or direct steaming or downloading via the data port. Preferably, an amplifier 5 is provided to control the analog output parameters of a playback signal, including increasing the level of the signal as necessary for display and/or playback over a display such as an electroluminescent, LED, LCD, or other type of panel display 6 or an audio device 7, which may be in the form of headphones or speakers. The panel display 6 may also serve as an input device 8 if in the form of a touch screen, or a separate input device may be provided to enable control of playback parameters and input of file selection or program execution commands. The separate input device 8 may include any combination of buttons, switches, dials, slides, voice input, or other input devices, and may optionally include a cursor-control function for controlling a cursor or other indicator on the display screen 6 in order to enable selection of items on a displayed menu. In order to enable portability, the prayer device 1 also needs an internal power supply (not shown), which may by way of example and not limitation be a extended life or rechargeable battery. Optionally, the prayer device may include appropriate interface hardware and software to enable the device to be operated or controlled remotely through a remote control device and/or wireless Internet or cellular connection. The device may be equipped with an answering machine capability and access control via a password or PIN. Finally, as shown in FIG. 1, the prayer device 1 may include fixing, mounting or embedding elements 9 to enable the prayer device to be fixed to, mounted on, or embedded in a tombstone or near a grave location.

This illustrated prayer device 1 can be set to play automatically at programmed time intervals, or may be manually operated or operated via a remote control depending on the user's selection. The invention may include several models and classifications according to different embodiments of the invention, such as (1) a basic digital/electronic model (2) a tablet type model with a digitized screen (3) an intelligent device programmed via an applications program to carry out the functions of a dedicated device, as well as other advanced functions. The models of all embodiments are portable and some have the option to be mounted, embedded or fixed to tomb stones, coffins, mausoleum, or next to barrel locations. Each embodiment may have several options and designs to perform a specific function. Intelligent device classifications can include intelligent portable media players (IPMP), digital audio players (DAP), and smartphones, tablets, watches, and televisions to which the application program or "app" has been downloaded.

The prayer device 1 may optionally include or be used with an additional outer box or casing (not shown) having ornamental custom designs or religious representation on it such as a cross, crescent, star, etc., to be displayed at the deceased's burial location.

Figure 2:
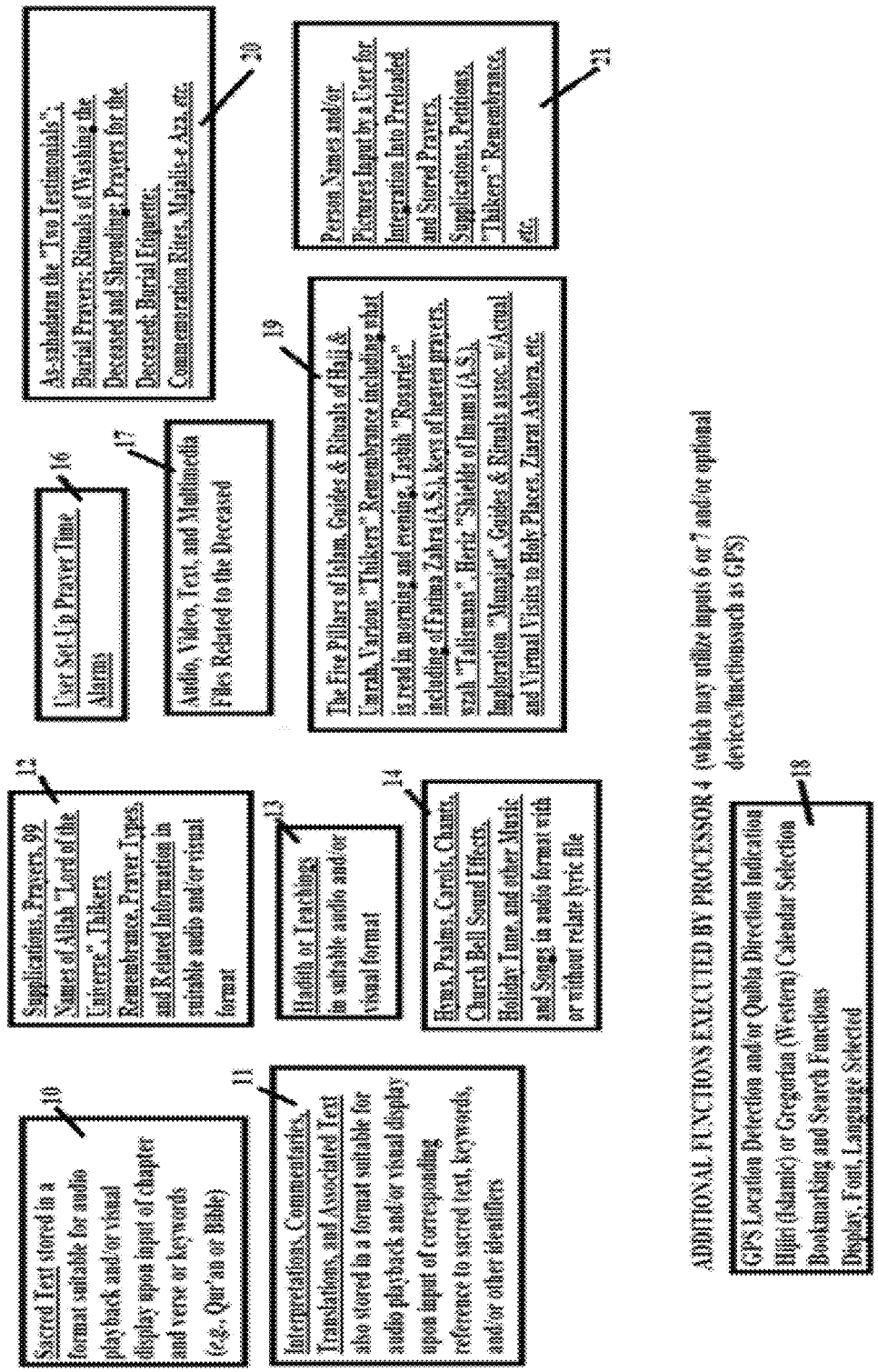
FIG. 2 illustrates the layout of the memory portion of the specialized prayer device of a preferred embodiment of the invention.

Stored in memory 2 of the prayer device 1 are a plurality of files 10-21 that assist in ritual and prayer, and provide commemorative functions for the deceased. These files are generally illustrated in FIG. 2, although the examples provided in FIG. 2 are not exhaustive, and some of the illustrated files may be excluded or modified to meet the needs of different religious faiths.

In general, files 10-21 may be in audio format, video format, audio and video format, or in audio format with associated text that can be displayed on video display screen 6 while the audio file is being played back over audio output device 7. Playback of a specific file may occur upon selection of the file through the input device 8, or automatically at pre-programmed times or intervals.

According to one embodiment, files 10-21 may be adapted specifically for use by adherents of the Islam religion and, by way of example, may include one or more of the below functions. Most of the below functions will operate either automatically as programmed or manually or both.

The content of sacred text file(s) 10 may include an audio, visual, and/or audiovisual presentation of the complete Holy Qur'an (Full Holy Quran with 114 Surahs, 6236 verses or only selected parts or Surah(s), an audio, visual, and/or audiovisual display of the Holy Qur'an Arabic text with synchronized voice recitation, and/or an audio, visual, and/or audiovisual display of the Holy Quran text in authentic and beautiful Uthmanic or other types of fonts.

The content of interpretation, comment, and translation file(s) 11 may include an audio, visual, and/or audiovisual Holy Qur'an interpretation/Tafseer Al-Jalalian: from the most famous Tasfseer of Holy Qur'an in Arabic or another language, and may include any of a number of accredited publications such as Tafseer Ibn-Kather Complete (Arabic, English), Tafseer Altabari in Arabic and more. The audio, visual, and/or or audiovisual interpretation may be displayed in both Arabic and another language throughout reading or listening to the recitation. File or files 11 may also include audio, visual, and/or audiovisual Holy Qur'an Translations of the holy book which will cover one or more but not limited to the following languages: English, French, Farsi (Persian), Turkish, Chinese, Russian, Uygur (Uighur), Urdu, German, Malay, Pashto, Thai, German, Italian, Spanish, Japanese, Mandarin, Hindi, Portuguese, Bengali, Russian, Vietnamese, Javanese, Korean, Polish, Burmese, Pashto, Romanian, Hausa, Romanian, Dutch, Azerbaijani, Yoruba, Igbo, Northern Berber, Albanian, Kurdish, Amharic, Somali, Serbo-Croatian, Fula, Hungarian, Greek, Zulu, Czech, Bulgarian, Swedish, Akan, Hebrew, Finish, Kashmiri, Mongolian, Tatar, Slovak, Congo, Latin, Malay, Spanish, Indonesian, Hausa, Azerbaijan, Denmark, Bosnia, Portugal, etc.

An optional feature for execution by processor 3 in connection with file(s) 10 and/or 11 is to enable selection of the reciter's or translator's voice. This enables selection of a voice from one of the famous reciters of the Holy Qur'an such as: Al-Suadais, Al-Shuraim, Al-Menshawi, Al-Ajimy, Al-Ghamidi, Abdul-Basit, Al-Hudhaify, Al-Afasy and others. Other preferred reciters may be downloaded through the data port of the prayer device 1.

As illustrated in FIG. 12, the content of file(s) 12 may include audio, visual, and/or audiovisual presentation or display of the Holy 99 Allah Names with beautiful pictures (images and audio) and be associated with an option to include translations of the 99 names of Allah, "Lord of the Universe" Praise upon his name, Most Gracious, Most Merciful, to other languages along with the displays. In addition, file(s) 12 may include audio, visual, and/or audiovisual representation of various types of prayers, including forgiveness and appeal prayers, holy site associated prayers (with optional location-based retrieval), occasion and holiday prayers including prayers during the holy month of Ramadan, Prophet's (saw) prayers, Tasbeeh (rosary) prayers, and so forth, as well as audio, visual, and/or audiovisual presentation of Du'aa/Supplications, with the optional feature of the Du'aa voice, text, video or combination thereof displayed on the screen 6 in synchronization with playback over playback device 7 of an audio recitation by a remarkable voice.

The content of file(s) 13 an audio, visual, or audiovisual display of the Hadith collection, which includes topics on Islamic manner and behavior, as well as other accredited publications on Islamic conduct, such as Riadh As-sahiheen, 40 Hadith Qudsi, Sahih Albukhari, Sahih Muslim, and so forth. An associated option may permit selection of other materials related to specific religious sects, and in particular to materials reflecting the sect's attributes, rituals and preferences. Also optionally included in this section of the memory 2 are audio, visual, and/or audiovisual files concerning mourning's ceremonies and associated prayers (which may also or alternatively be included in section 12), and documentary videos on various topics.

Block 14 is reserved for carols, chants, church bell sound effects, holiday tunes, hymns, psalms, music, and the like. This block may be omitted when the prayer device is used for Islamic religion and prayer, but may be especially useful for Christian set ups, an example of which is discussed below.

Block 16 indicates a memory used for Salat (prayer) Time Set up. The memory stores the times for use by an automatic azan alarm that announces the Salat times. Also included may be an Azan Collection of Famous Muazzen, i.e., voice recordings of well-known calls to prayer.

Block 17 permits storage of audio, visual, and/or audio-visual multimedia files related to one or more deceased persons, and which may include wills, music, messages, family trees, life's lessons, favorite music or songs of the decedent(s), pictures, photos, family albums, favorite prayer, accomplishments, advice, videos, national holidays or other personal attributes Block 18 in FIG. 2 lists varies additional functions which may be stored in memory 2 as programs or applets for retrieval and execution by processor 3. One of the programs is a display of Qibla directions, i.e., a display of which direction to face during prayer based on user selection from a list of countries and cities worldwide, or in case of GPS capabilities, on the user's actual location. Another application is a calendar selection option that permits the user to selected either the Islamic Hijiri calendar or the Gregorian Calendar. Finally, a bookmarking function may be used to bookmark a user's favorite passages for future reference and/or quick searching of surah and verse.

Block 19 in FIG. 2 permits storage of additional audio, visual, and/or audiovisual presentations or displays of prayers, guides, rituals, and so forth. For example, block 19 may provide storage for presentations or displays related to the Five Pillars of Islam, guides and rituals of Hajj and Umrah, various "Thikers" Remembrance (including what is read in morning and evening), "Tasbih" rosaries (including of Fatima Zahra (A.S.)), keys of heaven prayers, "Awzah" invocations, "Heriz," Imploration "Munajat," actual and virtual visits of holy places guide and rituals, "Ziarat," and "Ashora."

Block 20 in FIG. 2 may include additional audio, visual, and/or audiovisual presentations related to burial and mourning prayers and rituals, including by way of example and not limitation, "As-shadatan" (the two testimonials); prayers during the burial; rituals of washing the deceased; burial etiquette and shrouding; prayers on the deceased; commemoration rites; "Majalis-e Aza," and so forth.

Block 21 in FIG. 2 provide storage for the names and/or pictures of persons that are input by a user of the prayer device for integration into preloaded and stored prayers, supplications, petitions, "Thikers" Remembrance, etc.

Those skilled in the art will appreciate that the above list is not exclusive, even for Islamic ritual and prayer, and that the contents of memory 2 may be varied without departing from the scope of the invention. For example, the contents of memory 2 may be tailored for children with simplified text, colors, illustrations, cartoons, animation, designs, etc., as appropriate.

By way of another example, while many of the functions may be the same for Islam and Christianity, the memory content related to the Christian faith may include the following:

The content of sacred text block 10 may include an audio, visual, and/or audiovisual presentation of the complete Christian sacred book or only selected verses or section. One or more versions of, for example, the Christian Bible in different languages, such as the modern King James Version, new international version (1984) in English, the Reina-Valera version (1960) in Spanish, the Louis Segond version in French, the Luther Bible (1545) in German, the João Ferreira de Almeida Atualizada version in Portuguese, the Chinese union version, or by way of example, a version with Arabic text, may be included. Alternatively, one or more different versions of the English Christian Bible may be included, such as the Douay-Rheims Bible, the Authorized King James Version, the English Revised Version, the American Standard Version, the Revised Standard Version, the New American Standard Version, the New King James Version, the New International Version, and the English Standard Version, and more. Still further, versions unique to different denominations or sects may be provided, such as the sixty-six books of the Protestant canon or the eighty-one books of the Ethiopian Orthodox Church canon. Each included version may include synchronized voice recitation.

A sacred text selection function based on input sect or denomination may be included, together with font selection capabilities and other presentation options, such as selection of a reciter or reciter's voice. as well an option to simultaneously display the text in multiple languages or scripts while listening to recitation of the text in a desired language.

Available translations of the Christian Bible are available in, without limitation, at least the following languages: English, French, Farsi (Persian), Turkish, Chinese, Russian, Uygur (Uighur), Urdu, German, Malay, Pashto, Thai, German, Italian, Spanish, Japanese, Mandarin, Hindi, Portuguese, Bengali, Russian, Vietnamese, Javanese, Korean, Polish, Burmese, Pashto, Romanian, Hausa, Romanian, Dutch, Azerbaijani, Yoruba, Igbo, Northern Berber, Albanian, Kurdish, Amharic, Somali, Serbo-Croatian, Fula, Hungarian, Greek, Zulu, Czech, Bulgarian, Swedish, Akan, Hebrew, Finish, Kashmiri, Mongolian, Tatar, Slovak, Congo, Latin, Malay, Spanish, Indonesian, Hausa, Azerbaijan, Denmark, Bosnia, Portugal, translations to be divinely inspired, Greek Septuagint, the Aramaic Peshitta, etc. Translations in any one or more of these languages may be optionally provided.

The memory area indicated by block 12 may, in this example, include files related to audio, visual, and/or audiovisual presentations various types of prayers including common prayers such as the Lord's Prayer, and/or the Rosary Prayer; as well as other prayers popular with specific denominations.

Blocks 11-14 may, in this example, include audio, visual, and/or audiovisual presentations to accompany visits to holy sites, including appropriate site-specific prayers, presentations concerning mourning ceremonies, holiday ceremonies, stories, and traditions, music and lyrics for popular hymns and carols, and the sound of church bells, favorite Bible stories and teachings of Jesus, and so forth.

Holiday-related presentations may optionally be set via input device screen 6 or 8 and processor 3 to playback when the holidays occur. Other settings may include playback settings such as selection of different church bell types and tunes, and file-selection settings that permit selection of files related to particular denominations or sects, including for example Catholic, Orthodox, or Protestant denominations, with corresponding attributes, rituals and preferences.

Block 17 in this example permits storage of audio, visual, and/or audiovisual multimedia files related to one or more deceased persons, and which may include wills, music, messages, family trees, life's lessons, favorite music or songs of the decedent(s), pictures, photos, family albums, favorite prayer, accomplishments, advice, videos, national holidays or other personal attributes. Also, block 18 in this example includes varies additional functions, including functions stored in non-erasable memory or in electrically-erasable programmable read only memories (EEPROMs), or programs or applets that may be downloaded by a user and stored in memory 2 for retrieval and execution by processor 3. One of the functions may be a bookmarking function used to bookmark a user's favorite passages for future reference and/or quick searching of surah and verse. Again, as with the Islam example described above, the prayer device may include features and functions tailored for children.

Block 19 in this example may include audio, visual, and/or audiovisual presentations or displays related to prayer during the burial; rituals of washing the deceased and shrouding; prayers on the deceased; burial etiquette; commemoration rites; and so forth.

Block 20 in this example may include provide storage for the names and/or pictures of persons that are input by a user of the prayer device for integration into preloaded and stored prayers, supplications, petitions, etc.

Another example of content that may be included in blocks 10-20 of FIG. 2 is content, in visual, audio, and/or audiovisual form, that could be related to the Jewish faith. In that case, for example, block 10 may include complete and/or abridged versions of the Hebrew Bible (Tanakh) or any of its twenty-four books and sections and/or each of the three parts: the five books of the Torah ("teaching" or "law"), the Nevi'im ("prophets"), and the Ketuvim ("writings"), with optional synchronized voice recitation. Bible versions may be selected in accordance with a selected sect or tradition, i.e., Orthodox, Conservative, Reform, Renewal, Reconstruction, Sephardic (Spain, Arab countries, Turkey), Ashkenazi (Europe, Russia), MIzrachi (Iraq, Persia, India), Sephardim, Karaite, and/or Samaritan. Translations of texts may be provided in selected languages, including the languages listed above, with options to select a translator's or reciter's voice. Also, block 11 may include content related to famous teachings or commentary and debate from sages, including commentary on the Torah by the Rabbis and/or Midrash and/or Responsa.

In this example, a block may include all or selected verses or sections of the siddur prayer book, as well as prayers for each day and or occasions, mourning-ceremony-related prayers, with the option of playing back selections from a preloaded list of prayers at different times a day, including Shacharit, Mincha, and/or Arvit prayers and lengthier prayers on special days, such as the Shabbat, as well as special holiday prayers such as Musaf, the Shema Yisrael, and the Amidah ("the standing prayer") for holidays including Rosh HaShanah, Yom Kippur, Sukkot, Simchat Torah, Chanukah, Tu BiShvat, Passover, Lag BaOmer, Shavout, and so forth.

In this example, block 17 may again be arranged to permit storage of audio, visual, and/or audiovisual multimedia files related to one or more deceased persons, and which may include wills, music, messages, family trees, life's lessons, favorite music or songs of the decedent(s), pictures, photos, family albums, favorite prayer, accomplishments, advice, videos, national holidays or other personal attributes. Also, block 18 in this example includes varies additional functions, including functions stored in non-erasable memory or in EEPROMs, or programs or applets that may be downloaded by a user and stored in memory 2 for retrieval and execution by processor 3. One of the functions may be a bookmarking function used to bookmark a user's favorite passages for future reference and/or quick searching of surah and verse. Also, as with the Islamic and Christian examples described above, the prayer device may include features and functions tailored for children.

Block 19 in this example related to the Islamic faith may include audio, visual, and/or audiovisual presentations or displays related to prayer during burial; rituals of washing the deceased and shrouding; prayers on the deceased; burial etiquette; commemoration rites; and so forth.

Block 20 in this example may include provide storage for the names and/or pictures of persons that are input by a user of the prayer device for integration into preloaded and stored prayers, supplications, petitions, etc.

Additional optional functions that might be provided in association with any of the examples set forth above include a search function for chapters, verses, words, with links to language translations and explanations. In addition, data stored in memory 2 may be either preloaded by the device vendor, or added after purchase by a user or consumer by loading, copying, or downloading the data. As an option and depending on the embodiment, users may able to download their preferred holy book, preferred reciter voice, prayers, updates and other data and electronic material, from supported websites via the Internet and other available media. Preferably, the above-described prayer device may be used indoors or outdoors, taking into account protection against weather elements. Finally, the device may be include various ornamental designs, shapes, colors, materials and sizes to suit most personal preferences.

Figure 3:
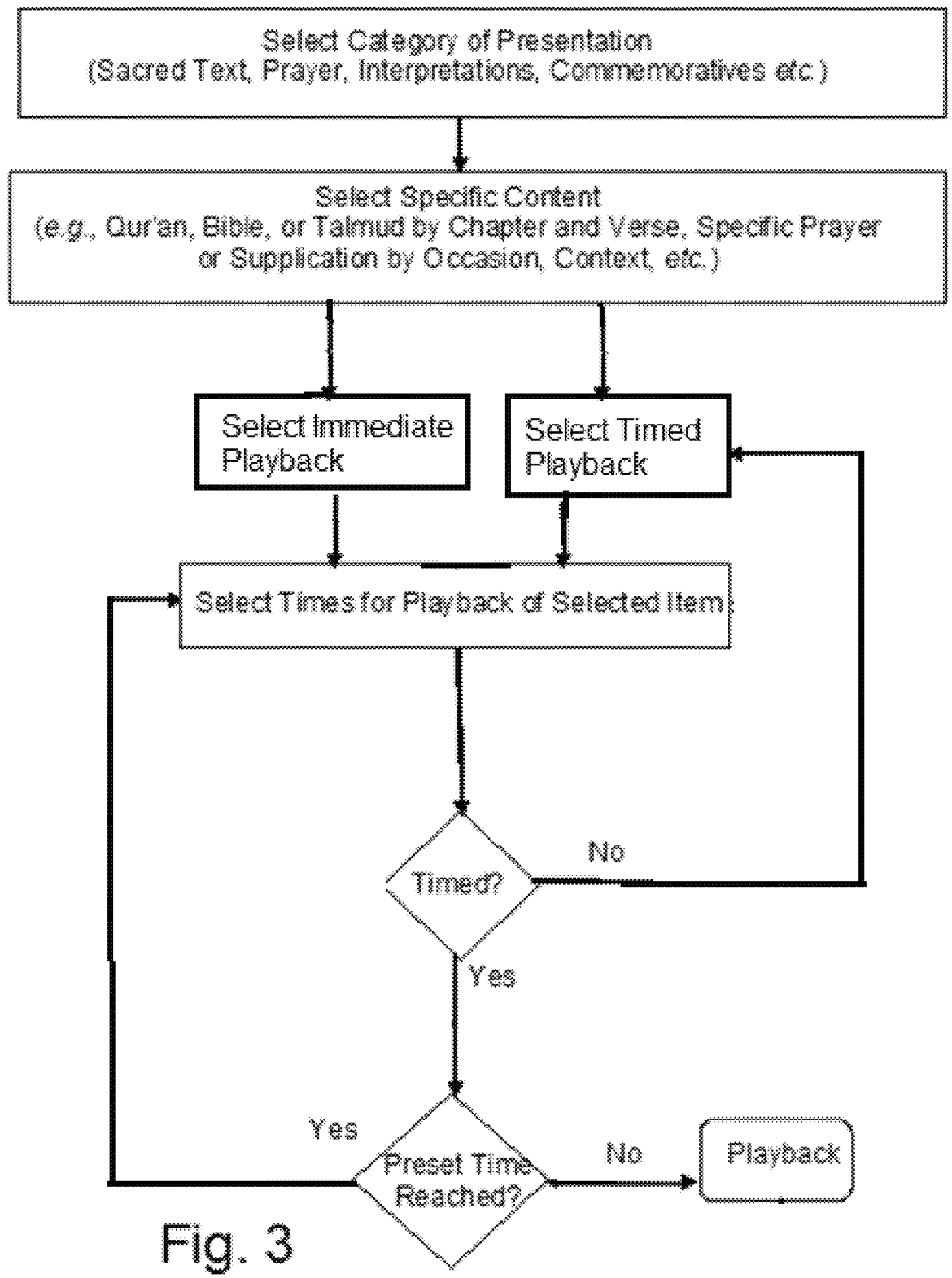
FIG. 3 illustrates a procedure for automatic playback of selected content.

FIG. 3 is a flowchart of the optional automatic playback option for the prayer device of the invention. As illustrated, the user uses the input device 8 (or screen 6 if arranged as a touchscreen) to select the type of content to be played back, after which the device displays specific files or content for selection. For example, the user may select "prayers," recitation of holy texts, and/or any of the other files stored in memory, after which the device displays specific prayers, texts, or content of other files, one or more of which may be selected by the user. The user will then be prompted to select either immediate or timed playback. If timed playback is selected, then the user will select a time or date, or multiple times and/or multiple dates, for playback of the selected prayer, and the device will playback the prayer at the selected times and dates. It will be appreciated that the illustrated method is exemplary only and may be modified by those skilled in the art, including provision for selecting multiple items for playback at different times and dates. As noted above, the prayer device of the invention may include any additional functions known to those skilled in the art, including display, playback, selection of one or more files, loading or downloading, and other functions. The illustrated method may be implemented by built-in software, or software such as an app obtained by downloading or connection to another computing or file storage device on which the app is stored.

What is claimed is:

1. A handheld portable prayer device, comprising:
    a display device configured to playback selected content comprising for audio, visual, and audiovisual content;
    an input device configured to enable a user to input device settings and selected content;
    at least one memory device configured to store the content to be selected;
    at least one processor, by executing computer-readable instructions stored on the at least one memory device, configured to execute content selection, content playback, and playback setting functions selected through the input device; and
    a power source,
    wherein said memory is configured to at least store passages from a sacred text and prayers, and further to store audio, visual, and/or audiovisual multimedia files input by the user, including names and/or pictures of a deceased person, and/or user-recorded messages related to the deceased person, wherein the stored passages and prayers include at least one preloaded passage or prayer dedicated to the deceased person, wherein the handheld portable prayer device is configured:
- (a) to be held in the user's hand and carried by the user to enable the prayer device to immediately playback any of the stored passages and prayers, and
- (b) to be left unattended at a burial place of the deceased person to autonomously playback, at times and dates selected by the user through the input device, the at least one preloaded passage or prayer dedicated to the deceased person, and at least one of the audio, visual, and/or audiovisual multimedia files input by the user in order to commemorate or mourn the deceased person without a living person having to be physically present at the burial place, wherein said input device includes a touch screen that also serves as a visual display, said processor controlling the touch screen to (i) display at least one list of the audio, visual, and/or audiovisual multimedia files, user-recorded messages, and stored passages and prayers, (ii) enable the user to select the audio, visual, and/or audiovisual multimedia files, user-recorded messages, and passages and prayers from the list of the audio, visual, and/or audiovisual multimedia files, user-recorded messages, and passages and prayers for future playback, and (iii) enable the user to select at least one future time and date at which the selected audio, visual, and/or audiovisual multimedia files, user-recorded messages, and passages and prayers are to be played back, and wherein said processor is further configured to playback the selected at least one of said passages and prayers robotically and without intervention by the user or any other living person at the times and dates selected by the user of the device, said times and dates including times and dates when said portable prayer device is unattended by the user or any other living person.

2. The handheld portable prayer device of claim 1, further comprising a digital signal processor, amplifier, and output for audio and audiovisual playback.

3. The handheld portable prayer device of claim 1, wherein said processor is configured to execute a recitation function of reciting said passages and prayers in synchronism with a text display.

4. The handheld portable prayer device of claim 3, wherein said recitation function includes an option of selecting prerecorded voices and/or reciters for audio or audiovisual playback.

5. The handheld portable prayer device of claim 4, wherein said recitation function for Muslim religion includes selecting prerecorded voices of reciters of sacred text of Al Qur'an Kareem using such recordings of audio and audiovisual by Clerk/Sheikh/Qari/Muj awwads.

6. The handheld portable prayer device of claim 1, wherein said passages are selectable by chapter and verse of the sacred text.

7. The handheld portable prayer device of claim 1, wherein multiple versions of said sacred text and/or said prayers are stored in said at least one memory device.

8. The handheld portable prayer device of claim 7, wherein the at least one memory device is configured to further store recordings of religious significance, wherein said recordings of religious significance include translations in different languages.

9. The handheld portable prayer device of claim 7, wherein said multiple versions include versions selectable by publication name, reference, religion, denomination, or sect.

10. The handheld portable prayer device of claim 1, wherein said at least one memory device further includes writings, presentations, and/or displays associated with a sacred text, religious teachings, vocal and/or musical presentations, commemorative material, and/or information on religious rites and ceremonies.

11. The handheld portable prayer device of claim 10, wherein said at least one memory device further stores Al Qur'an Kareem, prayers of different occasions, petitions, blessings, and further includes utterance 99 names of Allah, "Thikers" Remembrances, "Aawzah" Mantra, "Munaj at" Implorations to Allah (God), narrated Hadith, teachings, "Heriz supplication" Shields, "Azan" a call to ritual prayer, religious stories, musical presentations, and/or information on religious rites or ceremonies, commemorative material and other materials of religious significance to die Islamic faith.

12. The handheld portable prayer device of 10, wherein said at least one memory device further stores interpretations of sacred books in full or limited to chosen articles.

13. The handheld portable prayer device of claim 1, wherein said at least one memory device further stores files related to the deceased person, including at least one of data on the deceased, prayers, messages, photos, and/or favorites of the deceased, wherein the handheld portable prayer device is adapted to be mounted, embedded or fixed to tomb stones, coffins, a mausoleum, or next to barrel locations on a platform, pedestal or understructure.

14. The handheld portable prayer device of claim 1, wherein said processor is further configured to carry out a Quibla direction indication function.

15. The handheld portable prayer device of claim 1, wherein said processor is further configured to alert the user of daily prayer times for the Islamic faith.

16. The handheld portable prayer device of claim 1, wherein electronic copies of said sacred text, prayers and other recordings of religious significance are stored in said at least one memory device.

17. A method of controlling a prayer device to playback selected content at user-selectable times and dates, the prayer device including a display device configured to playback selected content comprising audio, visual, and audiovisual content, an input device including a touch screen that also serves as a visual display configured to enable a user to input device settings and selected content, at least one memory device configured to store content to be selected and further configured to at least store passages from a sacred text and prayers, at least one processor, and at least one power source, the method comprising:
- causing the at least one processor, via computer-readable instructions stored on the at least one memory device, to execute content selection, content playback, and playback setting functions selected through the input device,
- causing the at least one processor, via the computer-readable instructions, to control the input device to display a graphical list on the visual display of stored passages from the sacred text and prayers for playback;
- using the input device to select content as the selected content, the selected content comprising passages from the sacred text and prayers from the displayed list of stored passages from the sacred text and prayers using the input device to select additional content, stored on the at least one memory device, to be included in the selected content comprising additional types of audio, visual, and/or audiovisual content selected from the group consisting of: a religion or reference book, a reciter or reader voice, wills, music, family trees, life's lessons, favorite music or songs of a decedent, pictures or photos of family albums, favorite prayer of the decedent, accomplishments of the decedent, national holidays, and user-recorded audio or video;

using the input device to select at least one future time and date at which selected content is to be played back;

leaving the prayer device unattended at a burial place of a deceased person and automatically playing back, without intervention by the user or any other living person, the selected content at the selected future time and date in order to commemorate or mourn the deceased person without the user or any other living person having to be physically present at the burial place; and when the prayer device is not left unattended at the burial place of the deceased person, the prayer device is configured to be held by the user's hand and carried by the user to enable the prayer device to immediately play back any of the selected content.

18. A handheld portable prayer device configured to be carried to and left by a user at a burial place of a deceased person, and to autonomously playback prayers, holy text recitations, holiday observances, and recorded video or audio files related to the deceased person in order to commemorate or mourn the deceased person without the user having to be physically present at the burial place, comprising:

a display device configured to playback selected content comprising audio, visual, and audiovisual content;

an input device configured to enable a user to input device settings and selected content;

at least one memory device configured to store content to be selected;

at least one processor, by executing computer-readable instructions stored on the at least one memory device, configured to execute content selection, content playback, and playback setting functions selected through the input device; and a power source, wherein said at least one memory device is configured to at least store (a) preloaded passages from a sacred text and prayers, and (b) audio, visual, and/or audiovisual multimedia files input by a user, the input audio, visual, and/or audiovisual multimedia files including names and/or pictures of the deceased person, and/or user-recorded messages related to the deceased person, wherein the handheld portable prayer device is configured to handheld by a user, and to enable a user:

(c) to immediately play back any of the preloaded and stored passages and prayers in response to input at the input device by a user when the handheld portable prayer device is not left unattended at the burial place, and (d) to leave the handheld portable prayer device unattended at the burial place to play back, at the times and dates selected by the user, the audio, visual, and/or audiovisual multimedia files input by the user, wherein said input device includes a touch screen that also serves as a visual display, said processor controlling the input device to (i) display at least one list of the audio, visual, and/or audiovisual multimedia files, user-recorded messages, and preloaded and stored passages and prayers, (ii) enable the user to select the audio, visual, and/or audiovisual multimedia files, user recorded messages, and preloaded and stored passages and prayers from the list of audio, visual, and/or audiovisual multimedia files, user-recorded messages, and preloaded and stored passages and prayers for integration and future playback, and (iii) enable the user to select at least one future time and date at which the selected audio, visual, and/or audiovisual multimedia files, user-recorded messages, and preloaded and stored passages and prayers are to be played back, and wherein said processor is further configured to playback the selected audio, visual, and/or audiovisual multimedia files input by a user, robotically and without intervention by the user or any other living person at times and dates selected by the user of the portable prayer device, said times and dates including times and dates when said handheld portable prayer device is unattended by the user or any other living person.

* * * * *